United States Patent
Gammel et al.

(10) Patent No.: US 11,245,699 B2
(45) Date of Patent: *Feb. 8, 2022

(54) TOKEN-BASED DEVICE ACCESS RESTRICTION SYSTEMS

(71) Applicant: Schweitzer Engineering Laboratories, Inc., Pullman, WA (US)

(72) Inventors: Dennis Gammel, Pullman, WA (US); Josh Powers, Pullman, WA (US); Jason A. Dearien, Moscow, ID (US); Joshua Thomas Pereyda, Moscow, ID (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 245 days.

This patent is subject to a terminal disclaimer.

(21) Appl. No.: 16/655,663

(22) Filed: Oct. 17, 2019

(65) Prior Publication Data

US 2021/0120001 A1 Apr. 22, 2021

(51) Int. Cl.
*H04L 29/06* (2006.01)

(52) U.S. Cl.
CPC .......... *H04L 63/101* (2013.01); *H04L 63/083* (2013.01)

(58) Field of Classification Search
CPC ... H04L 63/101; H04L 63/083; H04L 63/105; H04L 63/0884; H04L 63/0807; Y04S 40/20
USPC ................................................ 726/1, 2, 4, 9
See application file for complete search history.

(56) References Cited

U.S. PATENT DOCUMENTS

| | | | |
|---|---|---|---|
| 6,747,957 B1 | 6/2004 | Pithawala | |
| 7,266,849 B1 | 9/2007 | Gregory | |
| 7,872,983 B2 | 1/2011 | Lai | |
| 8,387,137 B2 * | 2/2013 | Lee | .......... H04L 63/0823 726/20 |
| 8,520,670 B1 | 8/2013 | Giniger | |
| 8,553,544 B2 | 10/2013 | Lai | |
| 8,800,044 B2 | 8/2014 | Raad | |
| 9,686,125 B2 | 6/2017 | Smith | |
| 9,760,504 B2 | 9/2017 | Vidyapoornachary | |
| 9,769,060 B2 | 9/2017 | Dearien | |
| 9,866,483 B2 | 1/2018 | Smith | |
| 9,900,206 B2 | 2/2018 | Grussling | |

(Continued)

OTHER PUBLICATIONS

Trust-Based Identity Sharing for Token Grants, Dodanduwa et al, Jul. 2018 (Year: 2018).*

(Continued)

*Primary Examiner* — Jahangir Kabir
(74) *Attorney, Agent, or Firm* — Justin K. Flanagan

(57) ABSTRACT

The present disclosure pertains to systems and methods of restricting access to devices utilizing tokens. In some embodiments, a system may include a user requesting a token, ensuring the user requesting a token has the permission to request the token and is not the user approving the token. In some embodiments, the system may include the user granting the token, wherein the user granting the token is not the user receiving the token. The system ensures that the user accessing the device has the permission to access the device. Additionally, the system decreases the opportunities for insider attacks and increases the resistance to credential theft attacks. Further, the system increases the accountability for changes and the ability to review changes.

13 Claims, 7 Drawing Sheets

(56) References Cited

U.S. PATENT DOCUMENTS

| | | | |
|---|---|---|---|
| 9,923,779 B2 | 3/2018 | Berner | |
| 10,044,723 B1* | 8/2018 | Fischer | H04L 63/0807 |
| 10,341,311 B2 | 7/2019 | Smith | |
| 10,666,657 B1* | 5/2020 | Threlkeld | H04L 63/20 |
| 2007/0217344 A1 | 9/2007 | Krywaniuk | |
| 2011/0167483 A1* | 7/2011 | Lee | H04L 63/0823 |
| | | | 726/6 |
| 2013/0212285 A1 | 8/2013 | Hoffmann | |
| 2014/0029451 A1 | 1/2014 | Nguyen | |
| 2014/0123312 A1 | 5/2014 | Marcotte | |
| 2014/0143142 A1 | 5/2014 | Talker | |
| 2017/0026225 A1 | 1/2017 | Smith | |
| 2017/0026226 A1 | 1/2017 | Grussling | |
| 2017/0026243 A1 | 1/2017 | Bemer | |
| 2017/0026252 A1 | 1/2017 | Dearien | |
| 2017/0026276 A1 | 1/2017 | Dearien | |
| 2017/0026291 A1 | 1/2017 | Smith | |
| 2017/0026292 A1 | 1/2017 | Smith | |
| 2017/0026349 A1 | 1/2017 | Smith | |
| 2017/0046892 A1 | 2/2017 | Masters | |
| 2017/0026187 A1 | 3/2017 | Ramatchandirane | |
| 2017/0289117 A1 | 10/2017 | Powers | |
| 2018/0137297 A1 | 5/2018 | Drias | |
| 2019/0251765 A1 | 8/2019 | Masters | |
| 2019/0356489 A1* | 11/2019 | Palanisamy | H04L 63/10 |

OTHER PUBLICATIONS

PCT/US2020/053744 International Search Report and Written Opinion of the International Searching Authority dated Jan. 27, 2021.

* cited by examiner

TOKEN-BASED DEVICE ACCESS RESTRICTION SYSTEMS

TECHNICAL FIELD

The present disclosure relates to systems and methods for restricting access to devices utilizing tokens.

BRIEF DESCRIPTION OF THE DRAWINGS

Non-limiting and non-exhaustive embodiments of the disclosure are described, including various embodiments of the disclosure, with reference to the figures, in which.

DETAILED DESCRIPTION

Figure 1:
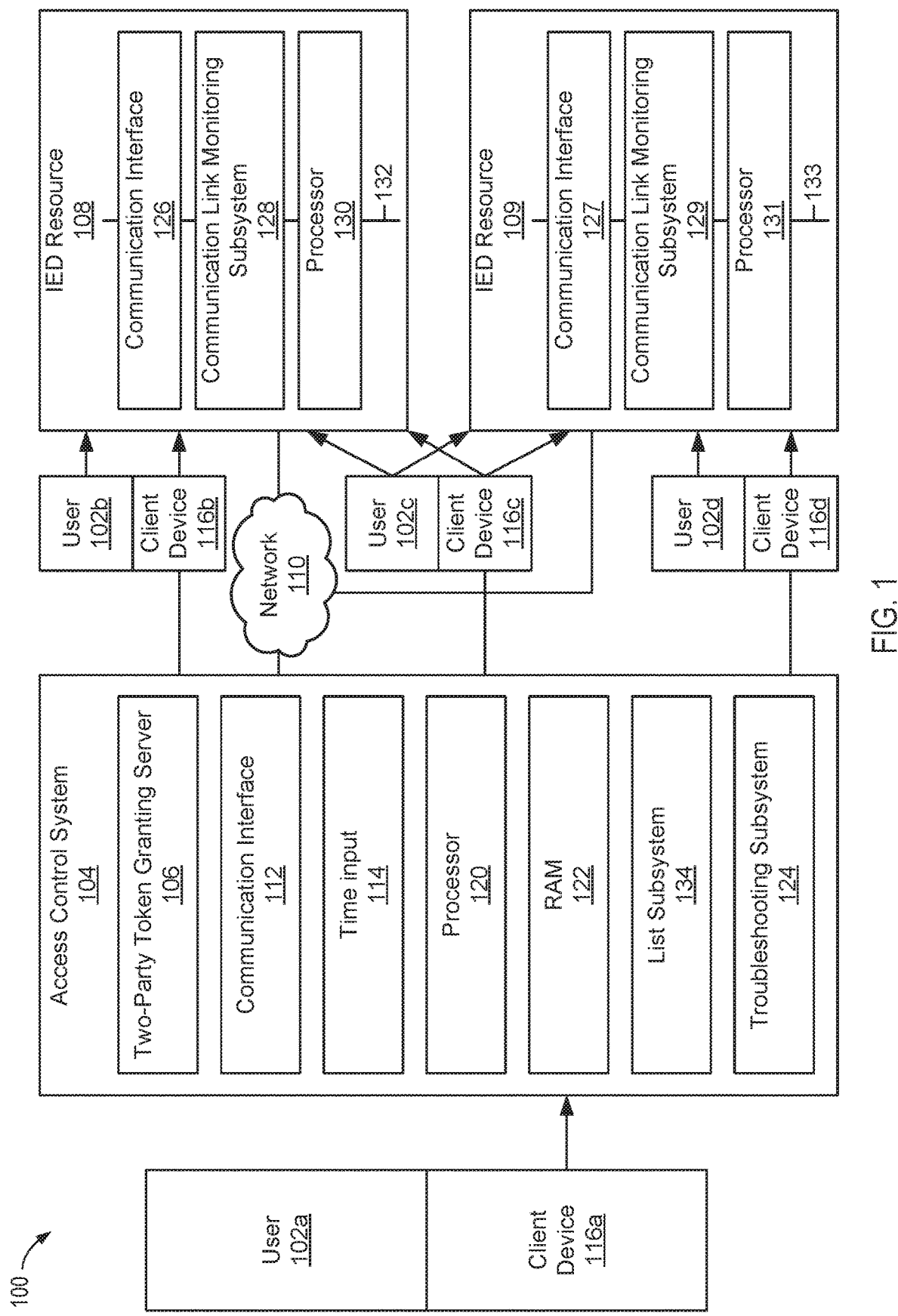
FIG. 1 illustrates a functional block diagram of an example of token-based access control of an intelligent electronic device (IED) utilizing an access control system.

Modern electric power distribution and transmission systems may incorporate a variety of communication technologies that may be used to monitor and protect the system. The communication equipment may be configured and utilized to facilitate an exchange of data among a variety of devices that monitor conditions on the power system and implement control actions to maintain the stability of the power system. The communication networks carry data for the proper assessment of power system conditions and for implementing control actions based on such conditions. In addition, repairs, alterations, upgrades and other adjustments to the IED resource may facilitate continued operation. The ability to corrupt the system is decreased by utilizing two or more parties to ensure user access to the intelligent electronic device (IED) resource is authorized.

Some electric power transmission and distribution systems may incorporate security protocols to ensure device access is restricted to authorized users. Restricting engineering access to an IED resource increases the security of the device. Ensuring that the authorized user has access to the device decreases the possibility of a malicious user accessing the device. Utilizing two or more users to authorize the user accessing the IED resource decreases the likelihood of corruption and unauthorized access.

An electric power transmission and distribution system may include numerous IEDs that are geographically distributed that each control a portion of the electric power transmission and distribution systems. Thus, if an unauthorized user is able to access any one of these IEDs, the electric power transmission and distribution system may be compromised. The unauthorized user may modify the state, configuration, or other data of the IED.

The present disclosure enhances the current security capabilities of an IED resource by increasing security to ensure an authorized user is accessing the IED resource utilizing tokens. In general terms, a token defines the access privileges and permissions associated with the person and/or device for a particular access session or defined time period. A token may be utilized to verify the user attempting to access the IED resource. In various situations, the user may be verified to ensure the user accessing the IED resource is the user authorized to access and/or alter the IED resource or data accessible via the IED resource. In various situations, the user granting the engineering access is not the user receiving the token and/or accessing the IED resource.

In various situations, the user requesting the token grant is not the user approving the token grant. Individual user access is decreased by ensuring the user receiving the token is not the user approving the token grant or the user granting the token. When each user's access to the device is minimized the ability to facilitate an inside attack and/or phishing attacks decreases. For malicious attacks to succeed, two or more users (instead of just one user) must be compromised. Additionally, requiring each user to possess a token to access a device ensures that each request is logged in the system increasing the change control on engineering access, review of proposed changes, and traceability.

In some embodiments, systems and methods may define a token to be a form of accessing the IED resource. In various embodiments, the token may be granted and/or approved based on the permissions and/or relationship of the user granting the token and user(s) receiving the token. Accordingly, approval of the token grant may be based on the role and/or permissions of the user granting and/or approving the user in addition to the role and/or permissions of the user receiving the token.

In one specific embodiment, a first user requests a token granting engineering access privileges to at least one IED resource be made available to a second user. The second user may then utilize the token to access the IED resource. In another specific embodiment, a first user may request a token for himself or herself, or the first user may request the token for a second user. A supervising user, not the user receiving the token, nor the one requesting the token, approves the token grant request. The token is then distributed to either the first user or second user. In such embodiments, distribution of the token utilizing two parties increases the ability to record and track actions taken on the system. Additionally, the ability of users and/or their data to be corrupted is decreased. In case of possible attack, tracking and recording steps within the system increases the ability to find the corrupted source.

Systems and methods disclosed herein may utilize various features available to monitor physical and/or logical communication links in the network and to take action based on physical changes (e.g., disconnection of a physical link) or logical changes (e.g., a change in routing) that result in changes to a data flow. As the term is used here, a logical communication link refers to a data communication channel between two or more communicating hosts in a network. A logical communication link may encompass any number of physical links and forwarding elements used to make a connection between the communicating hosts. The physical links and forwarding elements used to create a specific communication path embodying a logical communication link may be adjusted and changed based on conditions in the network.

Embodiments consistent with the present disclosure may be utilized in a variety of communication devices. A communication device, as the term is used herein, is any device that is capable of accepting and forwarding data traffic in a data communication network. The communication device may also be referred to as a client device and/or a user device. In some embodiments, the IED resource may serve as the communication device. In addition to the functionality of accepting and forwarding data traffic, communication devices may also perform a wide variety of other functions and may range from simple to complex devices.

The embodiments of the disclosure may be further understood by reference to the drawings, wherein like parts are designated by like numerals throughout. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

In some cases, well-known features, structures, or operations are not shown or described in detail. Furthermore, the described features, structures, or operations may be combined in any suitable manner in one or more embodiments. It will also be readily understood that the components of the embodiments as generally described and illustrated in the figures herein could be arranged and designed in a wide variety of different configurations.

Several aspects of the embodiments described may be implemented as software modules or components. As used herein, a software module or component may include any type of computer instruction or computer-executable code located within a memory device and/or transmitted as electronic signals over a system bus or wired or wireless network. A software module or component may, for instance, comprise one or more physical or logical blocks of computer instructions, which may be organized as a routine, program, object, component, data structure, etc., that performs one or more tasks or implements particular abstract data types.

In certain embodiments, a particular software module or component may comprise disparate instructions stored in different locations of a memory device, which together implement the described functionality of the module. Indeed, a module or component may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product, including a non-transitory computer and/or machine-readable medium having stored thereon instructions that may be used to program a computer (or another electronic device) to perform processes described herein. For example, a non-transitory computer-readable medium may store instructions that, when executed by a processor of a computer system, cause the processor to perform certain methods disclosed herein. The non-transitory computer-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of machine-readable media suitable for storing electronic and/or processor-executable instructions.

FIG. 1 illustrates a functional block diagram 100 of an example of token-based access control of an intelligent electric device (IED) resource 108 and 109 utilizing an access control system 104. A two-party token granting server 106 of the access control system 104 may generate, transmit, and distribute an at least one token to grant access to one or more IED resources (e.g., IED resources 108 and 109). A user 102b-d may present the token to the IED resource 108 and/or 109 for validation. The IED resource 108 and/or 109 may validate the token and grant the user 102b-d engineering access privileges. The access control system 104 may be integrated into an electric power transmission and distribution system to restrict access to one or more IED resources 108 and 109.

The two-party token granting server 106 may grant tokens to the user 102b-d to access the IED resource 108 and/or 109. The user 102b-d may utilize a client device 116b-d to request a token from the access control system 104 for the propose of accessing the IED resource 108 and/or 109. In some embodiments, a user 102a and/or a client device 116a may be ineligible to receive a token, even though the user 102a may grant tokens requested by other users 102b-d. In some embodiments, the first user 102a may request a token grant for the second user 102b. For example, user 102a may grant the token to user 102b. User 102a may make a token grant request to access control system 104, and the access control system 104 may grant and generate the token for user 102b. In some embodiments, a user 102b may request a token grant from user 102a. For example, user 102b may request a token grant. The token grant is sent to user 102a for approval. Upon approval, the access control system 104 grants and generates a token for user 102b. In some embodiments, the access control system 104 and/or the two-party token granting server 106 verifies that the user 102b-d is authorized to receive the token. In some embodiments, the user 102a verifies that the user 102b-d is authorized to receive the token. In some embodiments, the access control system 104, the two-party token granting server 106, and/or the user 102a may utilize a user access list to determine if the user 102b-d is authorized to receive the token. In some embodiments, the user access list is generated by a list subsystem 134. In some embodiments, the user access list may be populated with engineering access privileges. In some embodiments, the user access list may be populated with one or more roles associated with the user. In some embodiments, the user access list may be populated with permissions of the user. In some embodiments, the roles and/or permissions may be associated with engineering access privileges. In some embodiments, the user access list may be populated with the role associated with the user 102b-d until all tasks associated with the role are completed.

Once the user 102b-d requests the token and the user 102b-d is determined to be authorized to access IED resource 108 and/or 109, the access control system 104 provides the token for the user 102b-d. The two-party token granting server 106 may create the tokens on an as-needed basis based on authorized requests. The two-party token granting server 106 generates the token and a signature associated with the token. In some embodiments, the two-party token granting server 106 makes the token available to the user 102*b-d*. In some embodiments, the user 102*b-d* may make a request to the two-party token granting server 106 for the generated token. The request for the generated token may be made via the client device 116*b-d* utilizing the network 110. In some embodiments, the user 102*b-d* receives the token from the two-party token granting server 106. In some embodiments, the user 102*b-d* receives the token from the access control system 104. The user 102*b-d* may pass the token to the IED resource 108 and/or 109. The IED resource 108 and/or 109 validates the user 102*b-d* by sending the token to two-party token granting server 106 utilizing the communication network 110.

The IED resource 108 and/or 109 grants the user 102*b-d* access to the IED resource 108 and/or 109 once the user's 102*b-d* token is validated by the access control system 104 and/or the two-party token granting server 106. The user 102*b-d* may access the IED resource 108 and/or 109. If the two-party token granting server 106 does not verify the token, the IED resource 108 and/or 109 denies access to user 102*b-d*. In some embodiments, the two-party token granting server 106 may alert the IED resource 108 and/or 109 that the token has been granted and/or revoked. In some embodiments, the IED resource 108 and/or 109 may alert the user 102*b-d* that access is not granted. In some embodiments, the IED resource 108 and/or 109 may inform the user 102*b-d* why access was not granted. In some embodiments, the alert may be sent to the access control system 104 informing the system 104 that a failed attempt to access the IED resource 108 and/or 109 has occurred.

In some embodiments, each step may be recorded by the system 104. For instance, if the user 102*b* requests the token, the system 104 may record that request. The system 104 may record the user identification, time of the token request, and the IED resource 108 associated with the token request. Additionally, if the two-party token granting server 106 makes the token available for the user 102*b* and the user 102*b* has not retrieved the token, the system 104 may record both the two-party token granting server 106 making the token available for the user 102*b* and record that the user 102*b* has not retrieved the token. The system 104 may record elements such as time, user identification, the IED resource 108 associated with the token, changes made while accessing the IED resource 108, failed attempts to grant the token, failed attempts to use the token, and other related data. This recorded data may be utilized to increase traceability and keep users accountable.

In some embodiments, system 104 may be implemented using hardware, software, firmware, and/or any combination thereof. Moreover, certain components or functions described herein may be associated with other devices or performed by other devices. The specifically illustrated configuration is merely representative of one embodiment consistent with the present disclosure.

In some embodiments, the access control system 104 includes a communication interface 112 to communicate with the network 110 and client devices 116*b-d*. Communication interface 112 may facilitate communications with multiple devices. Access control system 104 may further include a time input 114, which may be used to receive a time signal (e.g., a common time reference) allowing access control system 104 and/or the two-party token granting server 106 to apply a time stamp to received data. In certain embodiments, a common time reference may be received via communication interface 112, and accordingly, a separate time input may not be required. One such embodiment may employ the IEEE 1588 protocol. A data bus may facilitate communication among various components of the access control system 104.

Processor 120 may process communications received via communication interface 112 and time input 114 and to coordinate the operation of the other components of access control system 104. Processor 120 may operate using any number of processing rates and architectures. Processor 120 may perform any of the various algorithms and calculations described herein. Processor 120 may be embodied as a general-purpose integrated circuit, an application-specific integrated circuit, a field-programmable gate array, and/or any other suitable programmable logic device.

Instructions to be executed by processor 120 may be stored in random access memory (RAM) 122. Such instructions may include information for processing routing and processing data packets received via communication interface 112 based on a plurality of traffic flows.

A troubleshooting subsystem 124 may aid in identifying configuration problems in system 104 and identifying possible solutions. For example, troubleshooting subsystem 124 may be active where a physical port link status indicates that a port is "up," but where traffic is not reaching the port the logical port link status may indicate that the port is "down."

The IED resource 108, 109 may include a communication interface 126, 127, a communication link monitoring subsystem 128, 129, and a processor 130, 131. The components of the IED resource 108, 109 may be in communication via a bus 132, 133. The communication interface 126, 127 may facilitate communications with multiple devices. In various embodiments, the communication interface 126, 127 may communicate via a variety of communication links, including Ethernet, fiber optic, and other forms of data communication channels.

The communication link monitoring subsystem 128, 129 may monitor communications received or transmitted by IED resource 108 and/or 109. In some embodiments, the communication link monitoring subsystem 128, 129 may determine a deviation from normal parameters, monitor packet loss, monitor latency, count data packets associated with particular data flows and monitor other metrics relating to data transmission. The communication link monitoring subsystem 128, 129 may determine whether traffic associated with a particular data flow is within expected ranges (e.g., satisfies established thresholds or falls within specified meter bands). In some embodiments, the communication link monitoring system 128, 129 may monitor each phase of a three-phase distribution line and provide an alert or trip a breaker if a fault is detected. In some embodiments, an IED resource 108, 109 may utilize the communication link monitoring system 128, 129 to protect, control, and/or monitor power distribution to a load, operation of a generator, detect arc flashes, trip breakers, trigger alarms, and/or other elements, components, or portions of the electrical power distribution system. Such information may be communicated to the access control system 104.

The processor 130, 131 may process communications received via communication interface 126, 128 and to coordinate the operation of the other components of client device 116*a*. Processor 130, 131 may operate using any number of processing rates and architectures. Processor 130, 131 may perform any of the various algorithms and calculations described herein. Processor 130, 131 may be embodied as a general-purpose integrated circuit, an application-specific integrated circuit, a field-programmable gate array, and/or any other suitable programmable logic device.

Figure 2:
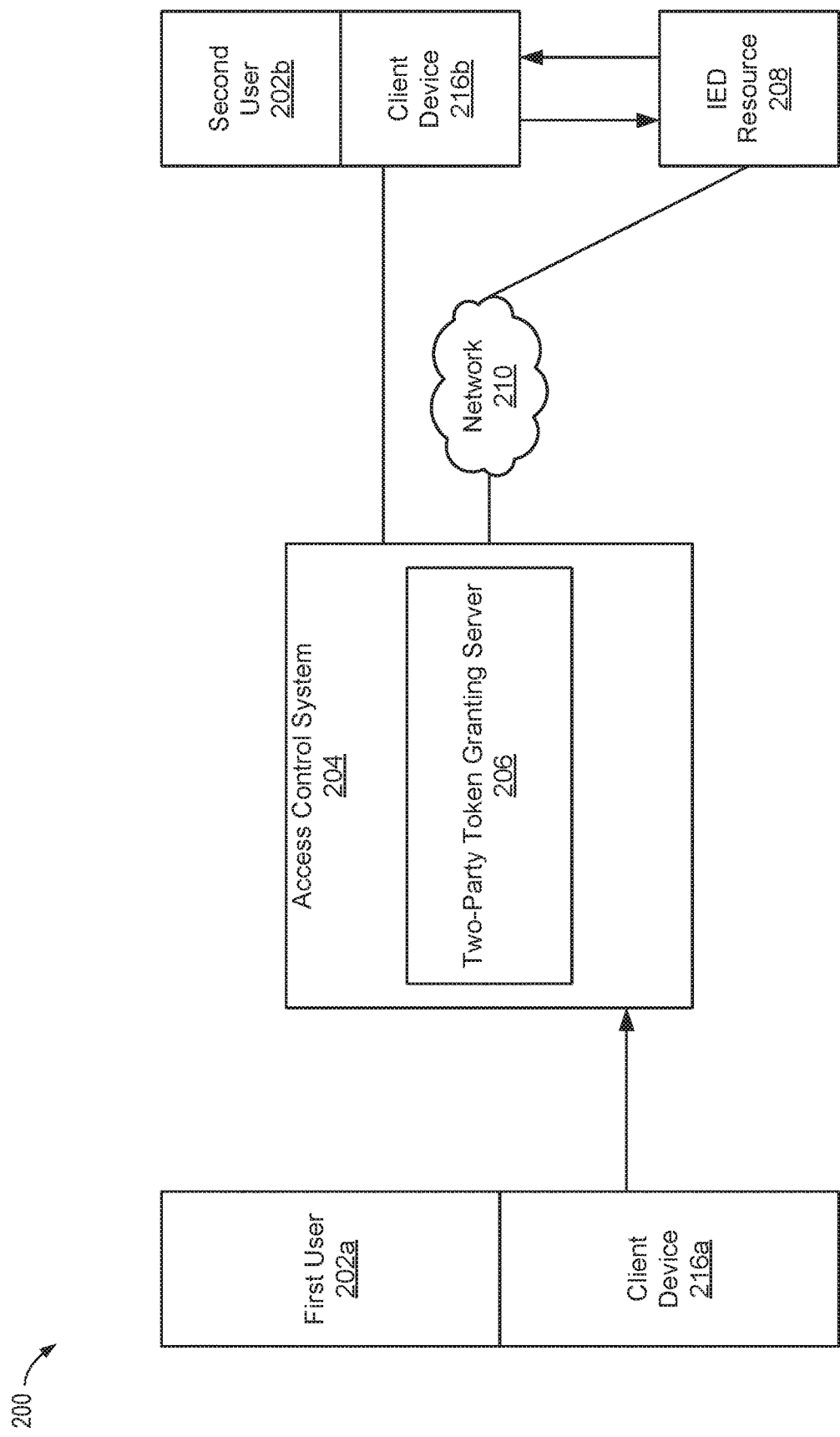
FIG. 2 illustrates a functional block diagram of an example of token-based access control of an intelligent electronic device (IED) utilizing an access control system.

FIG. 2 illustrates a functional block diagram 200 of an example of token-based access control of an IED resource 208 utilizing an access control system 204. A first user 202a sends a request to a two-party token granting server 206 for a token to be granted to a second user 202b. The request may be sent via a client device 216a utilizing the network 210. The two-party token granting server 206 determines if the first user 202a has the permission to grant the token. In some embodiments, the two-party token granting server 206 utilizes a user access list generated by a listing or "list" subsystem (not pictured) to determine if the first user 202a is authorized to grant the token. In some embodiments, the two-party token granting server 206 determines if the second user 202b is authorized to receive the token. The two-party token granting server 206 may utilize the user access list to determine if the second user 202b is authorized. The user access list may be populated with at least one permission associated with the second user 202b.

In some embodiments, the user access list may be populated with one or more roles associated with the second user 202b. The permissions and/or roles may determine the engineering access privileges available to the second user 202b. In some embodiments, the user permissions list may be populated with the engineering access privileges of the second user 202b. In some embodiments, the user access list may hold the role associated with the user second 202b until all tasks associated with the role are completed. The two-party token granting server 206 may utilize the user access list to verify the role, permissions, and/or engineering access privileges associated with the first user 202a including the permission to grant tokens. In some embodiments, if the first user 202a and the second user 202b are authorized, the two-party token granting server 206 grants the second user 202b the token.

In some embodiments, when the two-party token granting server 206 determines the first user 202a and/or the second user 202b is not authorized, the two-party token granting server 206 denies the token grant. In some embodiments, the two-party token granting server 206 may send a message to the first user 202a, the user 202a granting the token, that either the first user 202a does not have the permission to grant the token and/or second user 202b does not have the permission to receive the token and that the token grant may not be complete. In some embodiments, the message may detail the reasons why the token grant may not be completed. In some embodiments, the message may only state that the token grant was denied. In some embodiments, the two-party token granting server 206 may specify the first user 202a and/or 202b that is not authorized. When authorized, the two-party token granting server 206 generates a token. In some embodiments, the two-party token granting server 206 may generate the token with a signature to verify the token and/or the second user 202b. If the token is generated, the two-party token granting server 206 may make the token available to the second user 202b. The two-party token granting server 206 provides the token for the second user 202b. The second user 202b makes a request to the two-party token granting server 206 for the token.

The second user 202b may retrieve the token from the two-party token granting server 206. In various embodiments, the two-party token granting server 206 may create or generate the token on an as-needed basis only upon an approved request. In some embodiments, the token may be removed from the two-party token granting server 206 once the second user 202b retrieves the token. In some embodiments, if the second user 202b does not retrieve the token from the two-party token granting server 206, the two-party token granting server 206 may remove the token from the two-party token granting server 206. In some embodiments, the two-party token granting server 206 may wait a specified period of time before removing the token from the two-party token granting server 206. Once the second user 202b retrieves the token, the second user 202b may send the token to the IED resource 208. If the second user 202b does not use the token for the IED resource 208, then an alert may be sent to the two-party token granting server 206, the first user 202a, and/or a token-based access control system 204. The IED resource 208, in communication with the two-party token granting server 206 via the network 210, asks the two-party token granting server 206 to verify the token. In some embodiments, the IED resource 208 may locally verify the token using, for example, a locally stored public or symmetric key.

The IED resource 208 may send the token to the two-party token granting server 206. If the two-party token granting server 206 verifies the token, the IED resource 208 may grant access to the second user 202b. The second user 202b may then access the IED resource 208. If the two-party token granting server 206 does not verify the token, the two-party token granting server 206 may alert the system 204, the IED resource 208, and/or first user 202a. The IED resource 208 may inform the second user 202b of the denied access. In some embodiments, the IED resource 208 may send a message to the second user 202b to inform the second user 202b of the denied access.

In some embodiments, each step may be recorded by the system 204. For instance, if the first user 202a requests the token for the second user 202b, the system 204 may record that request. The system 204 may record the first user's 202a identification, second user's 202b identification, time of the token request, and the IED resource 208 associated with the token request. Additionally, if the two-party token granting server 206 makes the token available for the second user 202b and the second user 202b does not retrieve the token, the system 204 may record both the two-party token granting server 206 making the token available for the second user 202b and record that the second user 202b has not retrieved the token. The system 204 may record elements such as time, user identification, the IED resource 208 associated with the token, changes made while accessing the IED resource 208, failed attempts to grant the token, failed attempts to use the token, and other related access or attempted access data. This recorded data may be utilized to increase traceability and keep users accountable.

Figure 3:
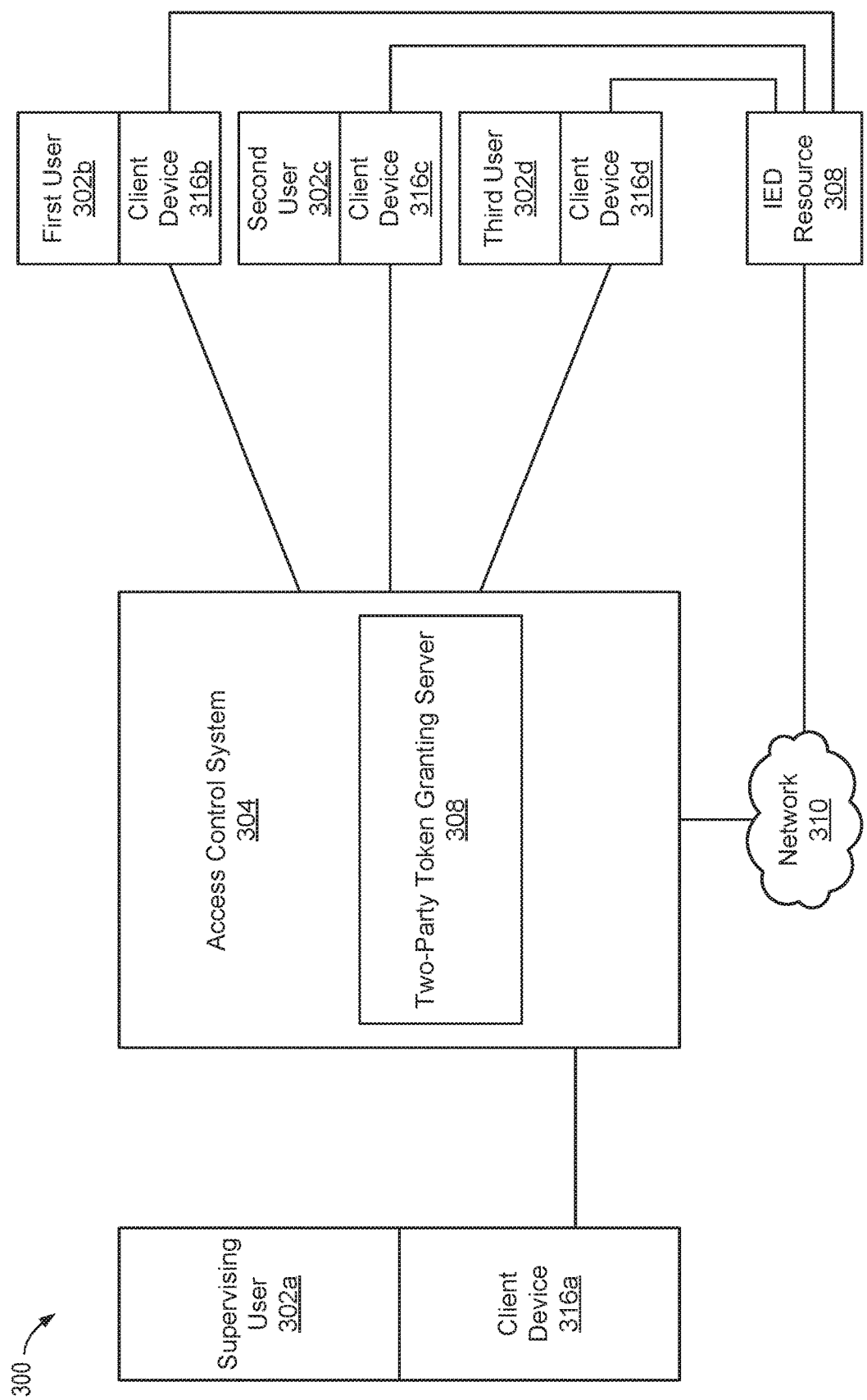
FIG. 3 illustrates a functional block diagram of an example of token-based access control of an intelligent electronic device (IED) utilizing an access control system.

FIG. 3 illustrates a functional block diagram 300 of an example of token-based access control of an IED resource 308 utilizing an access control system 304. A first user 302b sends a request to the two-party token granting server 306 for a token to be granted. The requested token may be for the first user 302b, a second user 302c, a third user 302d, or another user. In some embodiments, the requested token may be for two or more users. A two-party token granting server 306 receives the request to grant the token. The two-party token granting server 306 passes the token request to a supervising user 302a for approval. In some embodiments, the two-party token granting server 306 ensures the user 302b-d requesting the token is not the supervisor of the supervising user 302a. For example, if the supervising user 302a is a project manager who is supervising technicians and engineers, the two-party token granting server 306 may ensure that the user 302b-d is either a technician or engineer.

In some embodiments, the supervising user 302a determines if the user 302b-d for whom the token is requested is authorized to receive the token utilizing a user access list. In some embodiments, the user access list is generated by a list subsystem (not pictured). In some embodiments, the user access list is populated with one or more roles associated with the user 302b-d. In some embodiments, the user access list may be populated with one or more permissions of the user 302b-d. In some embodiments, the roles and/or permissions may be associated with engineering access privileges. In some embodiments, the user access list is populated with engineering access privileges associated with the user 302b-d. In some embodiments, the user access list may hold the role associated with the user 302b-d until all tasks associated with the role are completed. If the user 302b-d receiving the token is authorized to receive the token, the supervising user 302a approves the token grant request. Ensuring the user 302b-d is authorized may include ensuring the user 302b-d has engineering access privileges.

If the user 302b-d receiving the token is not authorized, the supervising user 302a denies the token grant. In some embodiments, the two-party token granting server 306 may send a message to the user 302b-d that the user 302b-d receiving the token is not authorized to receive the token and the token request has been denied. In some embodiments, the message may detail the reasons why the token grant may not be completed. In some embodiments, the message may only state that the token grant was denied. In some embodiments, if the token is requested for two users 302b-d the two-party token granting server 306 may specify the user 302b-d that does not have the permission. In some embodiments, the user 302b-d utilizes the client device 316b-d to communicate.

In some embodiments, when the supervising user 302a approves the token grant, the two-party token granting server 306 generates the token for the user 302b-d receiving the token. The two-party token granting server 306 may generate a signature associated with the token. In some embodiments, each token is unique to the user 302b-d. The two-party token granting server 306 distributes the token for the user 302b-d. The user 302b-d makes a request to the two-party token granting server 306 for the token. The user 302b-d may retrieve the token from the two-party token granting server 306. In some embodiments, when the user 302b-d retrieves the token from the two-party token granting server 306, the two-party token granting server 306 may remove the token from the two-party token granting server 306. In some embodiments, if the user 302b-d does not retrieve the token within a period of time during which the user 302b-d is authorized to retrieve the token, then the token granting server 306 may not create or generate the token at all. Once retrieved, the user 302b-d provides the token to the IED resource 308.

The IED resource 308, in communication with the two-party token granting server 306 via the network 310, asks the two-party token granting server 306 to verify the token. The IED resource 308 may send the token to the two-party token granting server 306. If the two-party token granting server 306 verifies the token, the IED resource 308 grants access to the user 302b-d. The user 302b-d may then access the IED resource 308. If the two-party token granting server 306 does not verify the token, the IED resource 308 denies access to user 302b-d. In some embodiments, the two-party token granting server 306 may alert the IED resource 308. In some embodiments, the IED resource 308 may alert the user 302b-d that access is not granted. In some embodiments, the IED resource 308 may inform the user 302b-d why access was not granted. In some embodiments, the alert may be sent to a token-based access control system 304 informing the system 304 that a failed attempt to access the IED resource 308 has occurred. In some embodiments, the IED 308 may locally verify the token using, for example, a locally stored public or symmetric key, even if communication by network 310 between the IED resource 308 and the access control system 304 is unavailable.

In some embodiments, steps may be recorded by the system 304. In some embodiments, all steps may be recorded. In some embodiments, selected steps may be recorded. In some embodiments, the two-party token granting system 306 may record the steps. In some embodiments, the IED resource 308 may record steps. In some embodiments, multiple systems/subsystems, devices, and/or servers may record the steps. For instance, if the first user 302b requests the token for the second user 302c, the system 304 may record that request. The system 304 may record the first user's 302b identification, second user's 302c identification, time of the token request, and the IED resource 308 associated with the token request.

Additionally, if the two-party token granting server 306 makes the token available to the second user 302c and the second user 302c has not yet retrieved the token, the system 304 may record both the two-party token granting server 306 making the token available for the user 302c and record that the user 302c has not yet retrieved the token. The system 304 may record elements such as the time, the user identification, the IED resource 308, the token accesses, changes made while accessing the IED resource 308, failed attempts to grant the token, failed attempts to use the token, and other data relating to the system 304. This recorded data may be utilized to increase traceability and keep users accountable.

Figure 4:
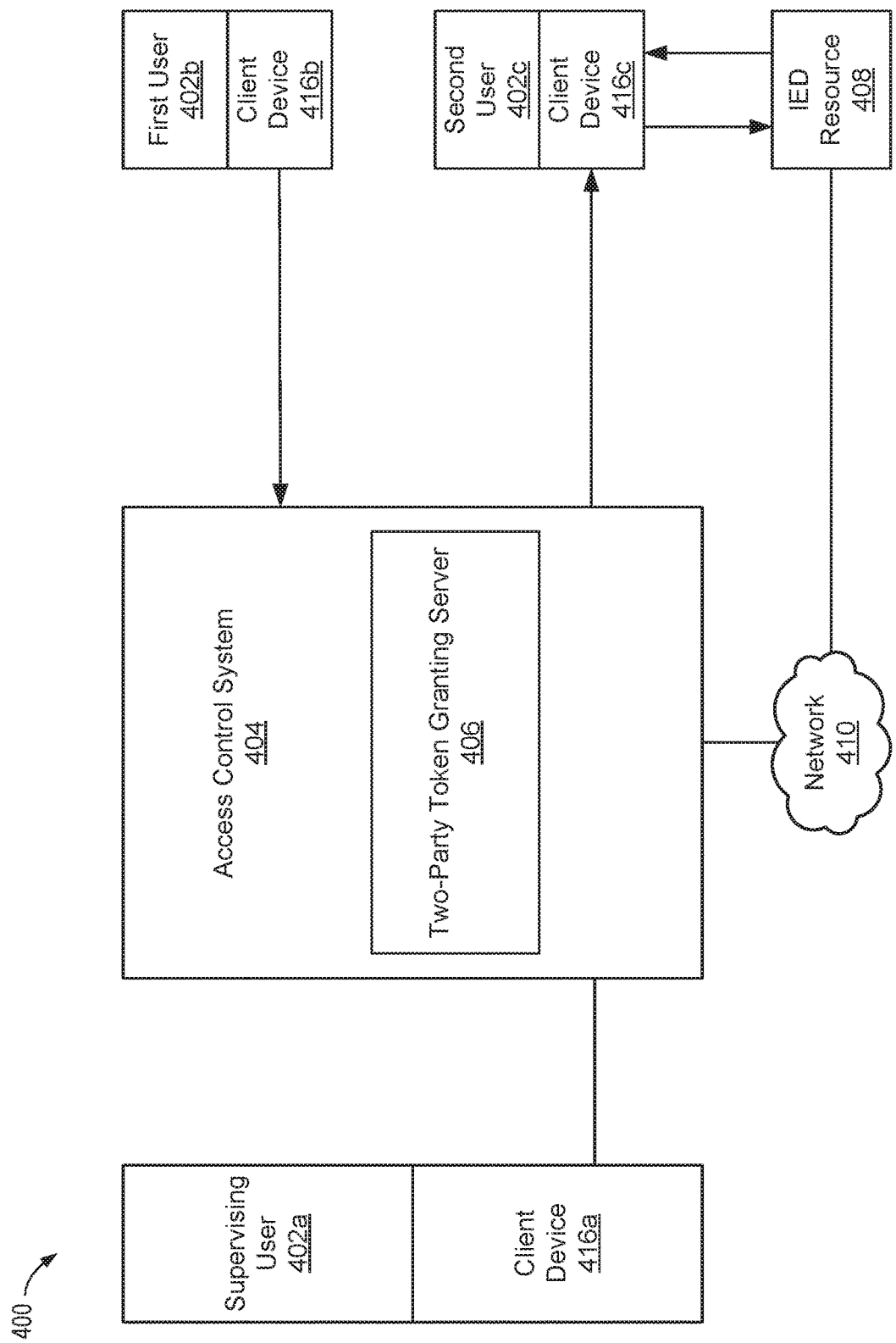
FIG. 4 illustrates a functional block diagram of an example of token-based access control of an intelligent electronic device (IED) utilizing an access control system.

FIG. 4 illustrates a functional block diagram 400 of an example of token-based access control of an IED resource 408 utilizing an access control system 404. In this embodiment, a first user 402b requests a token for a second user 402c. The first user 402b sends a request to a two-party token granting server 406 for a token to be granted. The first user 402b requests the token to be granted for the second user 402c. In some embodiments, the request may be sent via the client device 416b. The two-party token granting server 406 receives the request to grant the token. The two-party token granting server 406 sends the token grant request to a supervising user 402a for approval. In some embodiments, the supervising user 402a may utilize a user access list to authorize the second user 402c to receive the requested token. In some embodiments, the user access list is generated by a list subsystem (not pictured). In some embodiments, the user access list may be populated with one or more roles associated with the user second 402c. In some embodiments, the user access list may be populated with permissions of the second user 402c.

In some embodiments, the user access list may be populated with the role associated with the second user 402c until all tasks associated with the role are completed. In some embodiments, the roles and/or permissions may be associated with engineering access privileges. In some embodiments, a token-based access control system 404 ensures the supervising user 402a supervises the second user 402c. For example, the system 404 may determine the second user 402c is a technician. The system 404 may further determine those authorized to approve a technician for the requested token are a project manager and a project engineer. The system 404 may ensure the supervising user 402a is authorized as the project manager or project engineer. If the system 404 determines the supervising user 402a has permission, the system 404 sends the request to the supervising user 402a to approve or deny.

If the supervising user 402a approves the token grant, the second user 402c may be granted the token. If the supervising user 402a does not approve the token, the two-party token granting server 406 does not generate the token. In some embodiments, the two-party token granting server 406 may send a message to the second user 402c that the second user 402c is not authorized to receive the token and that the token request is not approved. In some embodiments, the message may detail the reasons why the token grant may not be completed. In some embodiments, the message may only state that the token grant was not approved.

In some embodiments, the supervising user 402a approving the second user 402c to receive the token allows the two-party token granting server 406 to generate the token for the second user 402c. The two-party token granting server 406 may generate the token and a signature for the token. The two-party token granting server 406 may distribute the token to the second user 402c. In some embodiments, the second user 402c may make a request to the two-party token granting server 406 for the generated token. In some embodiments, the second user 402c may retrieve the token from the two-party token granting server 406. In some embodiments, the two-party token granting server 406 may make the token available for a period of time, and if that period of time lapses, the token may no longer be available for the second user 402c to retrieve. In some embodiments, the supervising user 402a may be alerted that the second user 402c did not retrieve the token. In some embodiments, the first user 402b may be alerted that the second user 402c did not retrieve the token. The first user 402b may be alerted by the supervising user 402a, the second user 402c, the two-party token granting server 406, and/or another subsystem/system, server, or device of the system. Another token grant request may be made for the second user 402c.

Once the second user 402c retrieves the token from the two-party token granting server 406, the token may be removed from the two-party token granting server 406. In some embodiments, the two-party token granting server 406 may remove the token from the two-party token granting server 406. The second user 402c provides the token to the IED resource 408. The IED resource 408, in communication with the two-party token granting server 406 via the network 410, asks the two-party token granting server 406 to verify the token. The IED resource 408 sends the token to the two-party token granting server 406. If the two-party token granting server 406 verifies the token, the IED resource 408 grants access to the second user 402c. In some embodiments, the IED resource 408 may locally verify the token using, for example, a locally stored public or symmetric key. Accordingly, the IED resource 408 may verify the token even if communication with the access control system 404 is unavailable.

The second user 402c may then access the IED resource 408. If the two-party token granting server 406 does not verify the token, the IED resource 408 does not grant access to second user 402c. In some embodiments, the two-party token granting server 406 may alert the IED resource 408. In some embodiments, the IED resource 408 may alert the second user 402c that access is not granted. In some embodiments, the IED resource 408 may inform the second user 402c why access was not granted. In some embodiments, the alert may be sent to the system 404 to inform the system 404 that a failed attempt to access the IED resource 408 has occurred.

In some embodiments, steps may be recorded by the system 404. In some embodiments, all steps may be recorded. In some embodiments, selected steps may be recorded. In some embodiments, the two-party token granting system 406 may record the steps. In some embodiments, the IED resource 408 may record the steps. In some embodiments, multiple systems/subsystems, devices, and/or servers may record the steps. For instance, the system 404 may record the user identification, date, time, location, and other data associated with the first user's 402b request for the token. Additionally, if the two-party token granting server 406 makes the token available to the second user 402c and the second user 402c has not yet retrieved the token, the system 404 may record both the two-party token granting server 406 making the token available for the second user 402c and record that the second user 402c has not yet retrieved the token. The system 404 may record elements such as the time, the user identification, the IED resource 408, the token accesses, changes made while accessing the IED resource 408, failed attempts to grant the token, failed attempts to use the token, and/or other related data.

Figure 5:
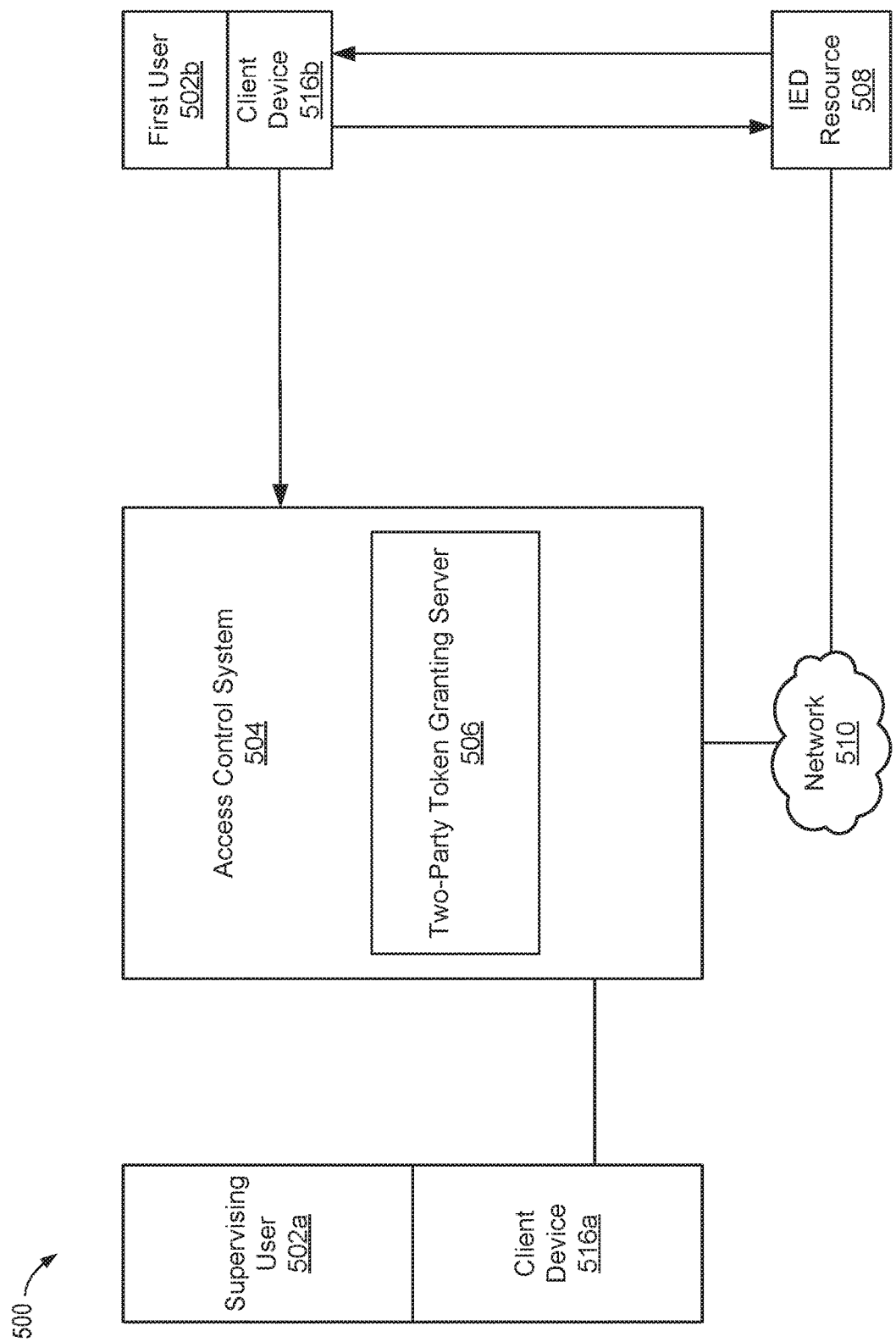
FIG. 5 illustrates a functional block diagram of an example of token-based access control of an intelligent electronic device (IED) utilizing an access control system.

FIG. 5 illustrates a functional block diagram 500 of an example of token-based access control of an IED resource 508 utilizing an access control system 504. In this embodiment, a first user 502b requests a token for the first user 502b. The first user 502b sends a request to a two-party token granting server 506 for the token to be granted. The first user 502b requests that the token be granted to himself/herself (i.e., to the first user 502b). In some embodiments, the request may be sent via client device 516b. The two-party token granting server 506 receives the request to grant the token from the first user 502b. The two-party token granting server 506 sends the token grant request to a supervising user 502a for approval. In some embodiments, the supervising user 502a may utilize a user access list to determine if the first user 502b is authorized to receive the requested token. In some embodiments, the user access list is generated by a list subsystem (not pictured). In some embodiments, the user access list is populated with one or more roles associated with the user 502a-b. In some embodiments, the user access list may be populated with permissions of the user 502b.

In some embodiments, the roles and/or permissions may be associated with engineering access privileges. In some embodiments, the user access list may be populated with the engineering access privileges of the user 502b. In some embodiments, the user access list may hold the role associated with the user 502a-b until all tasks associated with the role are completed.

In some embodiments, a token-based access control system 504 ensures that the supervising user 502a supervises the first user 502b. For example, the system 504 may determine the first user 502b is a project engineer. The system 504 may further determine those authorized to approve the project engineer for the requested token are a project manager and a regional manager. The system 504 may ensure the supervising user 502a is authorized as the project manager and/or regional manager. If the system 504 determines the supervising user 502a has permission, the system 504 may send the request to the supervising user 502a to approve or deny. If the supervising user 502a approves the token grant, the first user 502b may be granted the token. If the supervising user 502a does not approve the token, the two-party token granting server 506 does not grant the token. In some embodiments, the two-party token granting server 506 may send a message to the first user 502b that the first user 502b is not authorized to receive the token and the token request is not approved. In some embodiments, the message may detail the reasons why the token grant may not be completed. In some embodiments, the message may only state that the token grant was not approved.

Once the first user 502b is approved to receive the token, the two-party token granting server 506 may generate the token for the first user 502b. Once the token is generated, the two-party token granting server 506 may distribute the token to the first user 502b. For instance, two-party token-granting server 506 may only create the token once it is being retrieved. The first user 502b may retrieve the token from the two-party token granting server 506. In some embodiments, the two-party token granting server 506 may make the token available for a period of time, and if the period of time lapses, the token may no longer be available for the first user 502b to retrieve. In some embodiments, the supervising user 502a may be alerted that the first user 502b did not retrieve the token. In some embodiments, the first user 502b may be reminded to retrieve the token before the period of time lapses. The supervising user 502a may be alerted that the first user 502b did not retrieve the token by the two-party token granting server 506 and/or another subsystem/system, server, or device of the system. The first user 502b may make another token grant request.

The first user 502b provides the token to the IED resource 508. The IED resource 508, in communication with the two-party token granting server 506 via the network 510, asks the two-party token granting server 506 to verify the token. The IED resource 508 sends the token to the two-party token granting server 506. If the two-party token granting server 506 verifies the token, the IED resource 508 grants access to the first user 502b. In some embodiments, verifying the token includes the IED resource 508 verifying the integrity of the public or symmetrical key. The first user 502b may then access the IED resource 508. If the two-party token granting server 506 does not verify the token, the IED resource 508 denies access to the first user 502b. In some embodiments, the two-party token granting server 506 may alert the IED resource 508, whereupon the IED resource 508 does not grant access to the first user 502b.

In some embodiments, the IED resource 508 may alert the first user 502b that access is not granted. In some embodiments, the IED resource 508 may inform the first user 502b why access was not granted. In some embodiments, the alert may be sent to the system 504 as a notification to the system 504 that a failed attempt to access the IED resource 508 has occurred. In some embodiments, the alert may be sent to the supervising user 502a informing the supervising user 502a that a failed attempt to access the IED resource 508 has occurred. The alert may be utilized to increase the ability of the supervising user 502a, or the system 504, to react to a possible attack.

In some embodiments, steps may be recorded by the system 504. In some embodiments, all steps may be recorded. In some embodiments, selected steps may be recorded. In some embodiments, the two-party token granting system 506 may record the steps. In some embodiments, the IED resource 508 may record the steps. In some embodiments, multiple systems/subsystems, devices, and/or servers may record the steps. For instance, the system 504 may record user identification, date, time, location, and other data associated with the first user's 502b request for the token. Additionally, if the two-party token granting server 506 makes the token available to the first user 502b and the first user 502b has not retrieved the token, the system 504 may record both the two-party token granting server 506 making the token available for the first user 502b and record that the first user 502b has not retrieved the token. The system 504 may record elements such as time, the user identification, the IED resource 508 associated with the token, alterations made while accessing the IED resource 508, failed attempts to request the token, failed attempts to use the token, and other related data.

Figure 6:
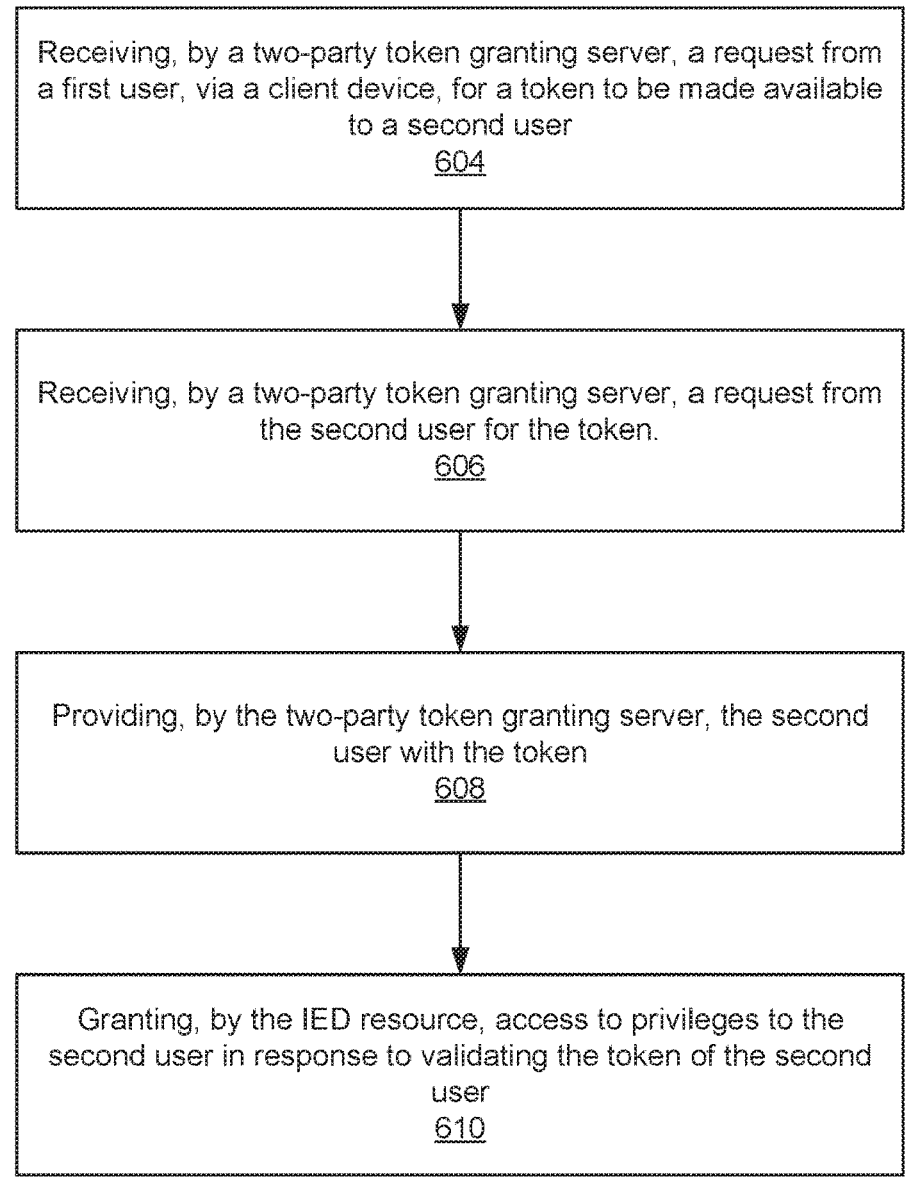
FIG. 6 illustrates a flowchart of a method for token-based device access restriction consistent with embodiments of the present disclosure.

FIG. 6 illustrates a flowchart 600 of a method for token-based device access restriction consistent with embodiments of the present disclosure. At 604, the two-party token granting server receives a request from a first user, via a client device, for a token to be made available for a second user. In various embodiments, the token is associated with engineering access privileges to at least one IED resource. The two-party token granting server may determine if the second user is authorized to receive the token. In some embodiments, the two-party token granting server may utilize a user access list to determine if the second user is authorized to receive the token generated by a list subsystem. In some embodiments, the two-party token granting server determining the second user is authorized to receive the token allows the two-party token granting server to grant the second user the token. In some embodiments, the two-party token granting server may further determine if the first user is authorized to grant the token. In some embodiments, if the two-party token granting server determines the user(s) is authorized, the two-party token granting server may grant the token.

At 606, the two-party token granting server receives a request from the second user for the token. At 608, the two-party token granting server provides the second user with the token. In some embodiments, the two-party token granting server may generate the token. In some embodiments, the two-party token granting server may generate a signature associated with the token. In some embodiments, once the second user retrieves the token, the two-party token granting server may remove the token from the two-party token granting server. In some embodiments, another subsystem/system, server, and/or device may remove the token from the two-party token granting server. In some embodiments, if the second user does not retrieve the token within a period of time, the token may be removed from the two-party token granting server. At 610, the IED resource in communication with the two-party token granting server via the communication network may grant engineering access privileges to the second user in response to validating the token of the second user. The second user may pass the token to the IED resource. In some embodiments, the second user may provide the token to the IED resource. The IED resource may send the token and/or the token to the two-party token granting server utilizing the communication network. The network may send confirmation from the two-party token granting server that the token and/or user is valid. The IED resource may allow the second user to access the IED resource. The second user may access the device to utilize the engineering access privileges. In some embodiments, each step is recorded. In some embodiments, selected steps are recorded. For example, the system, IED resource, and/or server, may record the date, time, location, user identification, IED resource, and other related data of a token grant request.

Figure 7:
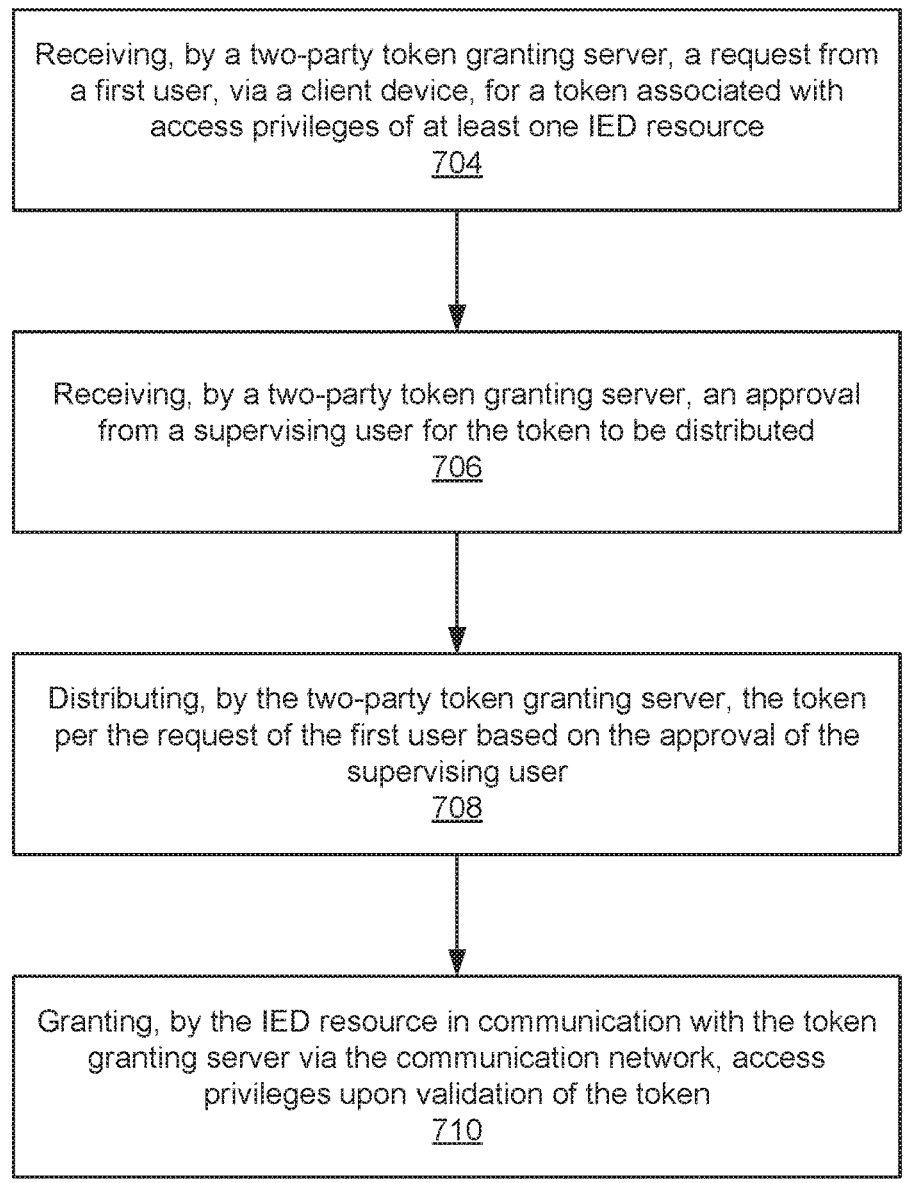
FIG. 7 illustrates a flowchart of a method for token-based device access restriction.

FIG. 7 illustrates a flowchart 700 of a method for token-based device access restriction consistent with embodiments of the present disclosure. At 704, the two-party token granting server receives a request from the first user via the client device for a token associated with engineering access privileges of at least one IED resource. The two-party token granting server may send this token grant request to a supervising user for approval. In some embodiments, the token granting server ensures the supervising user supervises the user receiving the token. In some embodiments, the supervising user may utilize a user authorization list to determine if the user is authorized to receive the token. At 706, the two-party token granting server receives approval from the supervising user for the token to be distributed.

At 708, the two-party token granting server distributes the token per the request of the first user based on the approval of the supervising user. The two-party token granting server may grant the token to the first user. The two-party token granting server may generate the token and a signature associated with the token. The two-party token granting server may make the token available for the first user to retrieve. In some embodiments, the token may be removed from the two-party token granting server when the first user retrieves the token. In some embodiments, the two-party token granting server may require the token be retrieved within a period of time. If the first user does not retrieve the token within the period of time, the token may be removed from the two-party token granting server. The first user may provide the token to the IED resource. The IED resource may ask the two-party token granting server to verify the token. The IED resource receiving verification allows the IED resource to allow the first user to access the IED resource. At 710, the IED resource, in communication with the two-party token granting server via the communication network, grants engineering access privileges upon validation of the token. In some embodiments, the actions within the system may be recorded. In some embodiments, the actions occurring while accessing the IED resource may be recorded.

While specific embodiments and applications of the disclosure have been illustrated and described, it is to be understood that the disclosure is not limited to the precise configurations and components disclosed herein. Accordingly, many changes may be made to the details of the above-described embodiments without departing from the underlying principles of this disclosure. The scope of the present invention should, therefore, be determined to encompass at least the following claims.

What is claimed is:

1. A system to restrict engineering access to an intelligent electronic device (IED) resource in a power delivery system, comprising:
   a communication interface to communicate with a first IED resource via a communication network;
   a processor; and
   a non-transitory computer-readable medium with instructions stored thereon that, when executed by the processor, cause:
   a two-party token granting server to:
      receive a request from a first user, via a first client device, for a token to be made available to a second user between a first time and a second time, wherein the token is associated with access privileges to at least one IED resource, including the first IED resource,
      receive a request from the second user for the token,
      in response to a determination that the request from the second user is received between the first time and the second time, generate the token and provide the token to the second user,
      in response to a determination that the request from the second user is before the first time or after the second time, deny the token to the second user without generating the token, and
      provide the token to the second user,
   wherein the first IED resource is configured to grant access privileges to the second user in response to validating the token of the second user, and
   wherein the first user and second user are different entities.

2. The system of claim 1, further comprising a list subsystem to generate a user access list that associates each of a plurality of users with one or more roles or permissions with respect to the first IED resource.

3. The system of claim 1, wherein the two-party token granting server is configured to generate the token for the second user and generate a signature associated with the token to facilitate validation of at least one of the token and the second user.

4. The system of claim 1, wherein the two-party token granting server is further configured to determine if the second user receiving the token is authorized to receive the token.

5. The system of claim 1, wherein the two-party token granting server is further configured to determine if the first user granting the token is authorized to grant the token.

6. The system of claim 1, further comprising a data storage to record the token request for the second user made by the first user.

7. The system of claim 6, wherein the data storage is further configured to record the access privileges associated with the token provided to the second user.

8. The system of claim 6, wherein the data storage is further configured to record event data associated with the token being utilized by the second user to access the first IED resource.

9. A method for restricting access to an intelligent electronic device (IED), the method comprising:
   communicating, by a communication network;
   receiving, by a two-party token granting server, a request from a first user, via a client device, for a token to be made available to a second user, wherein the token is associated with access privileges on an IED resource and is valid prior to an expiration time;
   receiving, by a two-party token granting server, a request from the second user for the token after the request from the first user and prior to the expiration time;
   generating, by the two-party token granting server, the token in response to the request from the second user prior to the expiration time;
   providing, by the two-party token granting server, the second user with the token; and
   granting, by the IED resource, access privileges to the second user in response to validating the token of the second user.

10. The method of claim 9, further comprising comparing the second user with a user access list of users and associated user roles.

11. The method of claim 9, further comprising determining, by the two-party token granting server, that at least one of the first user granting the token and the second user receiving the token is an authorized user.

12. The method of claim 9, further comprising generating, by the two-party token granting server, the token and a signature associated with the token to facilitate validation of at least one of the token and the second user.

13. The method of claim 9, further comprising removing the token from the two-party token granting server after distribution per the request of the first user.

* * * * *